United States Patent [19]
Jayant et al.

[11] Patent Number: 5,473,384
[45] Date of Patent: Dec. 5, 1995

[54] METHOD OF AND SYSTEM FOR ENHANCING DISTORTED GRAPHICAL INFORMATION

[75] Inventors: Nuggehally S. Jayant, Gillette, N.J.; Tsann-Shyong Liu, Taoyuan, Taiwan

[73] Assignee: AT&T Corp., Murray Hill, N.J.

[21] Appl. No.: 168,598

[22] Filed: Dec. 16, 1993

[51] Int. Cl.$^6$ ............................................ H04N 7/12
[52] U.S. Cl. ...................... 348/470; 348/396; 348/416; 348/607; 382/266
[58] Field of Search ........................... 348/470, 390, 348/396, 416, 607, 470, 613; 382/41, 56, 54, 275, 266, 268, 269; H04N 7/12

[56] References Cited

U.S. PATENT DOCUMENTS

| | | | |
|---|---|---|---|
| 4,754,492 | 6/1988 | Malvar | 382/41 |
| 5,014,119 | 5/1991 | Faroudja | 348/448 |
| 5,113,310 | 5/1994 | Jozawa et al. | 348/416 |

*Primary Examiner*—James J. Groody
*Assistant Examiner*—Glenton B. Burgess
*Attorney, Agent, or Firm*—David M. Rosenblatt

[57] ABSTRACT

A system for and method of enhancing image/video signals to be decoded is disclosed. The system for and method of post-filtering uses, preferably, a temporal filter and a spatial filter, both of which are adaptive but neither is required to be adaptive. However, the system for and method of post-filtering may also be used with only an adaptive spatial post-filter. In this case, the performance is upper-bounded by the performance of systems using both the adaptive temporal and adaptive spatial post-filter.

7 Claims, 2 Drawing Sheets

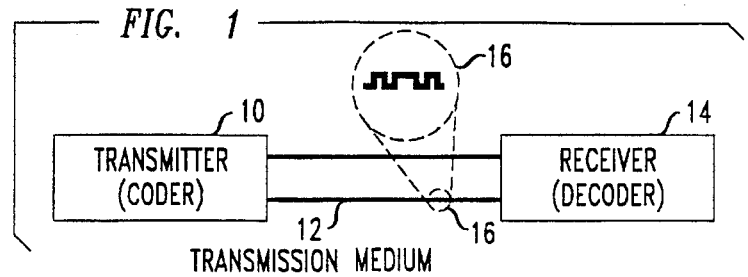

METHOD OF AND SYSTEM FOR ENHANCING DISTORTED GRAPHICAL INFORMATION

FIELD OF THE INVENTION

This invention relates to digital communications, and more particularly to a method of, and system for, enhancing distorted graphical information, including video signals.

BACKGROUND OF THE INVENTION

A video sequence comprises a series of images. Each image in the series of images comprises a plurality of picture elements (e.g., pixels) conveniently referred to as a frame.

A typical signal present in a decoder of a digital communications system contains distortion. Such distortion may be due to a number of different factors. For example, whenever a signal is quantized in a coder, quantizing distortion is introduced into the signal to be transmitted. Other factors may also introduce distortion into the signal to be decoded.

Digital communications systems used for video commonly include filters to help mitigate the effects of distortion, particularly when low bit rate video coding is used. The demand for good quality, low-bit rate video coding is growing and will continue to grow with the use of video over existing and future networks including ISDN and cable video distribution systems. Noise present in the video sequence at the receiver and/or decoder owing to quantization error is inevitable, especially in low bit rate video coding (currently illustrated by systems operating at 384 kbps or less). In order to reduce noise, post-processing of the reconstructed video sequence has proven useful particularly for current low bit rate algorithms.

Appropriately configured spatial and temporal post-filters are known to help alleviate the effects of distortion. This is because the intensities or characteristics of the pixels are spatially and temporally correlated.

A temporal post-filter is dependent upon time (e.g., the time ordered position of the current image or frame with respect to other images or frames in a sequence of images or frames) and is thus related to video, which is time dependent. It should be noted that "frame," "image," and "image frame" are used interchangeably herein. In other words, a temporal post-filter typically uses information from more than one frame to filter a single frame. This type of information makes a temporal post-filter well suited for post-filtering frames that have undergone interframe coding (i.e., the coding of a frame is dependent upon information in other frames). On the other hand, a spatial post-filter is dependent upon the location of a particular pixel or set of pixels for a particular single frame. Thus, spatial post-filters typically are not time dependent and do not typically rely on information from frames other than the current frame.

Temporal filtering is frequently used for interframe coding. The simplest and most straightforward temporal filter is a frame-averaging algorithm. However, such filters tend to degrade the appearance of moving objects. Hence, it is known to use motion compensation combined with a temporal filter to improve the quality of a video sequence. In M. I. Sezan, M. K. Ozkan and S. V. Fogel, "Temporally Adaptive Filtering of Noisy Image Sequences Using a Robust Motion Estimation Algorithm," Proc. ICASSP, pp. 2429–2432, 1991 and D. S. Kalivas and A. A. Sawchuk, "Motion Compensated Enhancement of a Noisy Image," Proc. ICASSP, pp. 2121–2124, 1990, a motion estimation algorithm is applied to a noisy image sequence to estimate the motion trajectories, i.e., locations of the pixels making up the image that correspond to each other for a predetermined number of successive image frames. Then, the intensity of a particular pixel at a current frame is estimated using the noisy image sequence intensities that are on the motion trajectory transversing that pixel. This can be done by using pixels from previous and subsequent frames that relate to the particular pixel of the current frame. The algorithm segments the video into moving and stationary components. Then, an adaptive temporal filter is applied to the components. In many image sequences, motion can be a complex combination of translation and rotation. Such motion is difficult to estimate and may require a large amount of processing. In J. M. Boyce, "Noise Reduction of Image Sequences Using Adaptive Motion Compensated Frame Averaging," Proc. ICASSP pp. III.461–III.464, 1992 and C. H. Lee, B. S. Jeng, R. H. Ju, H. C. Huang, K. S. Kan, J. S. Huang and T. S. Liu, "Postprocessing of Video Sequences Using Motion Dependent Median Filters," Proc. SPIE on Visual Communications and Image Processing. pp. 728–734, Boston, 1991, motion compensation is formed by using block matching (e.g., assigning a value to selected groups or blocks of pixels). Subsequently, frame averaging with motion compensation is applied (as described in J. M. Boyce, cited above) and median filtering with motion compensation is applied (as described in C. H. Lee et al., cited above).

Spatial filtering is also frequently used to help alleviate the effects of distortion. This is because some artifacts such as blocking and contouring last for a few frames temporally, making it very difficult to reduce those artifacts by using a temporal filter. These artifacts are the result of grouping or blocking pixels together during the encoding process. "Blocking" as used in the previous sentence refers to the grouping together of pixels during encoding. However, the "blocking" type of artifact refers to a physical result of grouping pixels. Typically, pixels that are grouped are represented by a single intensity (in the case of non-color encoding), for instance GRAY 153 on an eight bit scale from zero (white) to 255 (black). Pixels in the next group may be represented by GRAY 154. The human eye sees a smooth transition from GRAY 153 to GRAY 154 and thus, blocking and contouring artifacts do not exist. Blocking artifacts are typically reflected by adjacent groups of pixels appearing to be tiled (e.g., separate areas, akin to floor tiles). Contouring artifacts would exist if the adjacent groups of pixels appear to have a boundary or edge between them. The likelihood that these artifacts will exist increases if a low bit rate is used. Thus if only six bits (i.e., 64 values) were used to represent the intensity range from 0 (white) to 255 (black), i.e., only values 0, 4, 8, 12, . . . , 248, 252 were used, then GRAY 153 would become GRAY 152 and GRAY 154 would become GRAY 156. This larger difference has a much greater chance of being perceived by the human eye, and thus, may result in blocking and/or contouring.

A spatial filter was used in V. Ramamoorthy, "Removal of Staircase Effects in Coarsely Quantized Video Sequences," Proc. ICASSP pp. III.309–III.312, 1992 to reduce another distorting factor known as the staircase effect. The algorithm in the Ramamoorthy paper uses edge detection to classify sub-blocks of pixels into two classes: edge and non-edge. Subsequently, a median filter and a so-called D-filter, described, e.g., in A. Kundu and W. R. Wu, "Double-Window Hodges-Lehman (D) Filter and Hybrid D-Median Filter for Robust Image Smoothing," IEEE Trans. Acoust., Speech and Signal Processing, Vol. ASSP-37, No. 8, pp.

1293–1298, August 1989, are applied to edge and non-edge pixels respectively.

Though first used to code speech signals, see R. E. Crochiere, S. A. Webber and J. L. Flanagan, "Digital Coding of Speech in Subbands," Bell Syst. Tech. J., Vol. 55, pp. 1069–1085, October 1976, the subband coding concept is based on the decomposition of the image into different frequency subbands and the coding of each subband separately according to its statistics. Subband coding of images in two dimensions is described in J. W. Woods and S. D. O'Neil, "Subband Coding of Images," IEEE Trans. Acoust., Speech and Signal Processing, Vol. ASSP-34, pp. 1278–1288, October 1986 and H. Gharavi and A. Tabatabai, "Subband Coding of Monochrome and Color Images," IEEE Trans. Circuit and Systems, Vol. CAS-35, pp. 207–214, February 1988. Three dimensional subband coding of images is described in G. Karlsson and M. Vitterli, "Three Dimensional Subband Coding of Video," Proc. ICASSP, pp. 1100–1103, New York, 1988 and C. I. Podilchuk, N. S. Jayant and P. Noll, "Sparse Codebooks for the Quantization of Non-Dominant Subbands in Image Coding," Proc. ICASSP, pp. 2101–2104, Albuquerque 1990.

Recently, geometric vector quantization in the context of a full motion video coder based on a three dimensional sub-band framework was illustrated in U.S. Pat. No. 5,136,374, issued to N. S. Jayant and C. I. Podilchuk on Aug. 4, 1992, which patent is hereby incorporated by reference herein as if set forth in its entirety. The advantages of such an approach are the confinement of coding errors to individual subbands (if the quantization of subband signals is fine enough), and noise spectrum shaping due to varying bit assignment in the subbands. A very effective two-dimensional subband coder for still image compression has been developed based on perceptual modelling as described in R. J. Safranek and J. D. Johnston, "A Perceptually Tuned Subband Image Coder with Image Dependent Quantization and Post-Quantization," Proc. ICASSP, 1989 and U.S. patent application Ser. No. 08/098,561 filed Jul. 26, 1993 claiming priority to, ultimately, U.S. patent application Ser. No. 07/350,435 filed May 4, 1989, now abandoned, and assigned to the assignee of the present application. Others have made a three-dimensional subband coder for full motion video. By decomposing the data into different subbands, the 3-D system encodes the motion and spatial details by coding the relevant subband data. In contrast, the more traditional video coding technique based on motion compensation determines motion parameters by matching block data from one block to the next; the blocks where motion compensation fails are coded using a discrete cosine transform (DCT), the use of which is known to produce a blocky type of distortion especially pronounced at lower bit rates.

By way of comparison, subband coders sometimes introduce distortion in the form of high frequency artifacts or blurring of edges at low bit rates due to having too few bits for the encoding of the high frequency details. Distortion based on temporal filtering is often less bothersome perceptually than distortion introduced by motion compensation, though geometric vector quantizers in 3-D systems can also introduce blocky artifacts at low bit rates.

SUMMARY OF THE INVENTION

In accordance with one aspect of the present invention, temporal and spatial filters are combined to form a spatio-temporal filter for reducing noise and artifacts in video coding and enhancing a set of distorted image signals. A simple but effective alternative to spatio-temporal filtering is the use of a purely spatial post-filter. A system with a spario-temporal post-filter will be described for 3D subband coding in an illustrative embodiment.

More specifically, in accordance with aspects of an illustrative spario-temporal post-filter embodiment of the present invention, a method of, and system for enhancing a set of distorted image signals are described. The present invention processes sets of distorted image signals to produce enhanced image signals capable of being displayed with improved perceived quality on a visual display means.

In accordance with an illustrative preferred embodiment of the invention, an adaptive spatio-temporal post-filter with separable spatial and temporal components is used to lessen effects of distortion. A post-filter is considered "adaptive" if its characteristics are dependent upon the signal to be filtered, a previous signal that was filtered, and/or a future signal to be filtered. Adaptive filters are, therefore, conceptually different from non-adaptive post-filters whose characteristics are not signal dependent. The illustrative embodiment advantageously employs motion compensated frame averaging. Illustratively, each frame is comprised of a plurality of blocks. Each of these blocks is comprised of pixels. Each block of pixels is divided into sub-blocks. Each pixel in each sub-block of pixels is classified as being an edge, smooth, non-smooth with motion, or non-smooth without motion sub-block. Pixels belonging to the edge, smooth, and non-smooth with motion categories are filtered with multi-level median, double median, and median filters. Pixels in the non-edge non-smooth without motion category are left unfiltered to preserve corresponding image texture.

In accordance with another illustrative embodiment of the invention, only an adaptive spatial post-filter is used without a temporal post-filter.

Other aspects and advantages provided by the present invention will become apparent to those skilled in the art by referring to the "Detailed Description."

BRIEF DESCRIPTION OF THE DRAWINGS

FIG. 1 is a simplified block diagram of a digital communications system in which the invention can be used;

FIG. 2 is a detailed view of the decoder shown in FIG. 1;

FIG. 3 is a detailed view of the temporal filter shown in FIG. 2;

DETAILED DESCRIPTION

Figure 4:
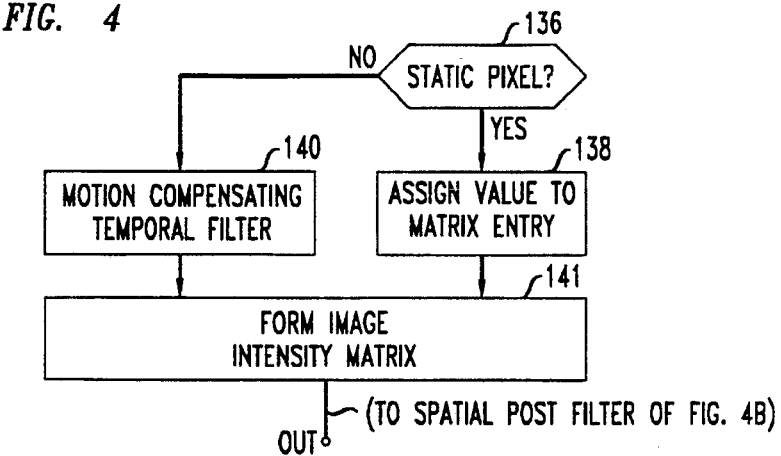
FIG. 4 is a detailed view of the steps performed in the temporal filter shown in FIG. 3.

FIG. 1 is a simplified block diagram of a digital communications system comprising a coder 10, a transmission medium 12, and a decoder 14. An illustrative coded signal 16 is transmitted via transmission medium 12 to the decoder 14. Upon arrival at the decoder 14, the coded signal 16 is typically distorted. The distortion may be due to a variety of factors including, but not limited to, noise introduced in the transmission medium 12, quantization error introduced in the coder 10, and/or other factors. The decoder 14 includes functionality to minimize the effects of distortion as will be described below.

FIG. 2 shows a preferred implementation of decoder 14 comprising a subband decoder 100, a first or temporal filter 110 and a second or spatial filter 112. Preferably, both the temporal filter 110 and the spatial filter 112 are adaptive. The output 114 of the temporal filter 110 is connected to the input 116 of the spatial filter 112. When a set of transmitted frames 101 arrives at decoder 14, the subband decoder 100 operates upon them to produce a set of decoded frames 102 as is well known in the art. However, this set of decoded frames 102 is still quite distorted due to errors in transmission and/or quantization and/or a host of other factors. Post-filtering, in the form of temporal post-filter 110 and spatial post-filter 112, enhances the perceptual quality of the decoded frames 102 and produces a set of reconstructed frames 104 for display. This is done by producing a set of partially post-filtered frames 103 from the temporal filter 110 that are then passed into the spatial post-filter 112.

FIG. 3 shows that, in the preferred form, the temporal filter 110 comprises a static/dynamic classifier 120 that classifies an image matrix into a set of static pixels and a set of dynamic pixels. The manner in which the classification is determined is explained below. The image matrix may be a matrix that has an entry corresponding to each pixel in a give image. The temporal filter 110 also comprises a motion compensated temporal filter 122 that is applied to the set of pixels that is determined to be dynamic. More specifically, let $f_i(x)$ be the image intensity at spatial location $x=(x_1,x_2)$ in frame i, and let $d_i(x,j)$ be the motion vector of an image point (e.g., a pixel in the $i^{th}$ frame that may move to a different location in the $j^{th}$ frame) at $f_i(x)$ from frame i to frame j. Then we define the motion compensated temporal filter 122 as follows:

$$\hat{f}_i(x) = H\{f_j(x - d_i(x,j)); j \in T\} \quad (1)$$

where T is a suitably chosen set of frames other than the $i^{th}$ frame and H is a temporal filter. Motion estimation and block matching algorithms are well known in the art and are frequently used to estimate the motion vector. For simplicity, the motion vector estimate may be derived by using block matching. For each block in the frame i, the closest-matching block to it in frame j is found. Then, the matching blocks are used to form the motion vector estimate $d_i(x,j)$. A common criterion used in judging the closest match between two blocks is the mean absolute difference (MAD) criterion as described in N. S. Jayant and P. Noll, Digital Coding of Waveforms Principles and Applications to Speech and Video, Prentice-Hall, Inc., 1984, though other particular criteria may be advantageous for some applications. For example, if $MAD_{i,j}(B)$ is the mean absolute difference between the current block B in the frame i and the closest block in frame j, then $$MAD_{i,j}(B) = \min_d \frac{1}{|B|} \sum_{x \in B} |f_i(x) - f_j(x - d)| \quad (1a)$$

where d is the displacement vector and |B| is the number of pixels in B.

Again referring to FIG. 3, if the input image sequence is static, i.e., $d_i(x,j)=0$, then frame averaging will result in the best possible noise reduction. For a static image with zero-mean, stationary white Gaussian noise, with N frames averaged together, a reduction in noise variance by a factor of N is achieved. In fact, under the assumption of independent white Gaussian noise, the frame average is a maximum likelihood estimate of the pixel value.

In practice, however, scene contents change from one frame to another. Therefore, direct averaging will result in oversmoothing of image details, especially moving objects. In order to avoid blurring moving objects, it proves advantageous to use a filter such as a multi-tap motion compensated frame averaging filter to perform motion compensation with frame averaging. An illustrative 3 tap filter may be represented by:

$$\hat{f}_i(x) = \frac{1}{3} \sum_{j=i-1}^{j=i+1} f_j(x - d_i(x,j)). \quad (2)$$

Comparing equation (2) to equation (1), H is the function of frame averaging and T is the set $\{i-1,i,i+1\}$. Note that $d_i(x,j)$ is not defined in newly exposed areas, i.e., for those pixels which were not visible in the previous field. The Gaussian distribution is approximate for the set of dynamic pixels. Let $MAD_i(j)$ be the mean absolute difference between a current block in frame i and the closest block in frame j. The output value $g_i(x)$ of the motion compensated temporal filter is defined as follows:

$$g_i(x) = \begin{cases} \hat{f}_i(x) & \text{if } MAD_i(i-1) < t \text{ and } MAD_i(i+1) < t \\ f_i(x) & \text{otherwise} \end{cases} \quad (3)$$

where t is a parameter depending on the noise distribution. Thus, the motion compensated temporal filter 122 operates only upon those pixels that are determined to be dynamic. Those that are determined to be static are assigned a value (see block 138 of FIG. 4). This is determined on a pixel by pixel basis. This is represented mathematically in equation (3). A combiner 123 is used to form an image intensity matrix (see 141 of FIG. 4) that is passed on to the spatial post-filter 112. Essentially, the combiner 123 uses the motion compensated dynamic pixels and the values assigned to the static pixels to form the image intensity matrix. In other words, the image intensity matrix comprises an intensity value associated with each pixel in the set of dynamic pixels that are temporally filtered and each pixel in the set of static pixels that are not temporally filtered.

Again referring to FIG. 3, in the temporal domain, it is desirable to filter out white Gaussian noise, while preserving image details without introducing new artifacts, such as block effects. Of course motion information to be used in spatial filtering must be extracted. The motion compensated temporal filter matches the moving object in successive frames, so that the image resolution is retained after filtering, as desired. The image resolution is retained after filtering because only the noise is removed.

As has been shown above, the quality of a received image can be improved by using the temporal filter 110 such as the one shown in FIG. 3. This yields the set of partially post-filtered frames 103. Each of the j frames to be processed is associated with a partially post-filtered frame in the set of partially post-filtered frames 103 and is represented, for example, by a set of (2N+1)×(2N+1) pixels. Each partially post-filtered frame may comprise, for example, an image intensity matrix having an entry associated with each pixel in the partially post-filtered frame. The set of partially post-filtered frames 103 is input into the spatial post-filter 112 which outputs the set of reconstructed frames 104. Details of the spatial post-filter 112 will be described below with respect to FIGS. 5 and 6.

Figure 5:
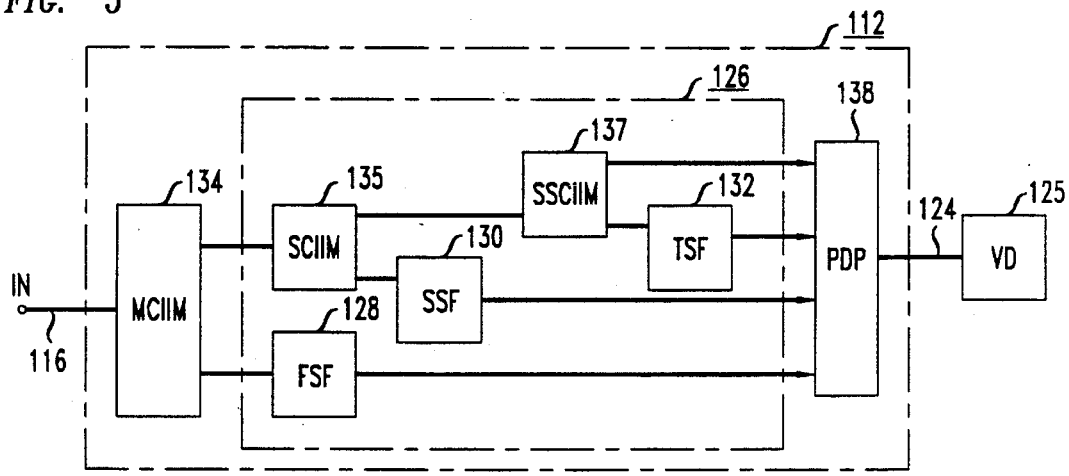
FIG. 5 is a detailed view of the spatial filter shown in FIG. 2.

FIG. 5 shows a preferred form for spatial filter 112 comprising an input node 116, an output node 124, and a filter 126. The output node 124 may be connected to a visual display ("VD") 125, such as a television or other display system. The input node 116 receives signals from the output node 114 of the temporal filter 110 (e.g., image intensity matrices). The filter 126 advantageously comprises a first sub-filter ("FSF") 128, a second sub-filter ("SSF") 130, and a third sub-filter ("TSF") 132. The spatial filter 112 also comprises a means for classifying the image intensity matrix ("MCIIM") 134 (available at the output node 114 of the temporal filter 110) into a set of edge pixels and a set of non-edge pixels (corresponding to decision block 142 of FIG. 5). The spatial filter 112 also performs a sub-classification of the image intensity matrix ("SCIIM") 135 and a sub-sub-classification the image intensity matrix ("SSCIIM") 137(corresponding to decision blocks 146 and 150 of FIG. 5, respectively). The outputs of the first sub-filter 128, second sub-filter 130, third sub-filter 132, and sub-sub-classifier of the image intensity matrix that are not input into the third sub-filter 132 are all converted into a form from which they can be displayed by a pre-display processor ("PDP") 138 (shown as step 153 in FIG. 6). This "form" may be the set of reconstructed frames 104 that may be displayed on the visual display 125.

Figure 6:
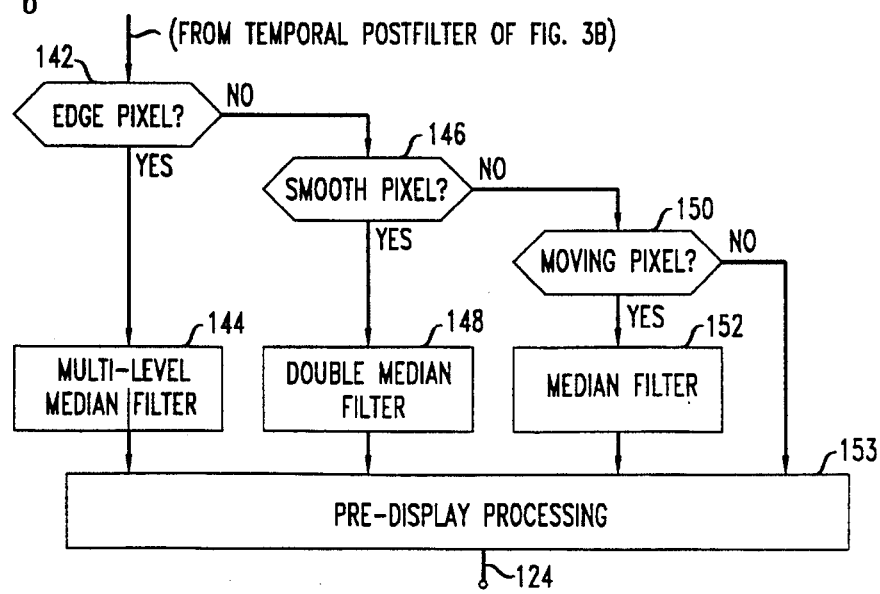
FIG. 6 is a detailed view of the steps performed in the spatial filter shown in FIG. 5.

Referring to FIGS. 5 and 6, the spatial post-filter takes as its input the set of partially post-filtered frames 103, e.g., image intensity matrices, and outputs the set of reconstructed frames 104. As shown in FIG. 2, the centerpoint of each image intensity matrix is $(x_1,x_2)$. For preserving the edge of the object, edge detection is used to classify sub-blocks of pixels into two classes: edge and non-edge. This determination, made by the means for classifying the image intensity matrix 134, may be performed, e.g., using the well-known Sobel edge detector.

Again referring to FIGS. 5 and 6, for the pixels belonging to edge class a multi-level value median filter is applied. The multi-level median filter may advantageously be used for the first sub-filter 128 previously mentioned. Let $g(x_1,x_2)$ be the image intensity matrix value associated with the pixel $(x_1, x_2)$ belonging to the edge class. Let the subsets $W_1, W_2, W_3, W_4$ (shown diagrammatically in FIG. 2) of the square window W be defined as:

$$W_1(x_1,x_2)=\{g(x_1,x_2+k); -N \leq k \leq N\},$$

$$W_2(x_1,x_2)=\{g(x_1+k,x_2+k); -N \leq k \leq N\},$$

$$W_3(x_1,x_2)=\{g(x_1+k,x_2); -N \leq k \leq N\},$$

$$W_4(x_1,x_2)=\{g(x_1-k,x_2-k); -N \leq k \leq N\}. \quad (4)$$

Suppose that $z_l(x_1,x_2)$, l=1,2,3,4, are the median values of the elements in the four subsets, i.e., $$z_l(x_1,x_2)=median[g(\cdot,\cdot) \in W_l(x_1,x_2), \quad (5)$$

respectively, and $$P_{max}(x_1,x_2)=max[z_1(x_1,x_2),z_2(x_1,x_2),z_3(x_1,x_2),z_4(x_1,x_2)],$$

$$P_{min}(x_1,x_2)=min[z_1(x_1,x_2),z_2(x_1,x_2),z_3(x_1,x_2),z_4(x_1,x_2)]. \quad (6)$$

Then the output of the multi-level median filter is defined by $$p(x_1,x_2)=median[g(x_1,x_2),P_{max}(x_1,x_2),P_{min}(x_1,x_2)], \quad (7)$$

for all $(x_1,x_2) \in E$, where E is the set of pixels belonging to edge class. The advantage of the multi-level median filter is its ability to preserve details of images, especially features such as a thin line that may not be preserved by the traditional median filter. But in the cases where noise may create a thin line, the multi-level median filter will assume that it is signal detail and preserve it. For avoiding preserving such erroneous detail, edge detection needs to be done by carefully fine-tuning the parameters.

Again referring to FIGS. 5 and 6, pixels belonging to the non-edge class will be subjected to a smoothness testing algorithm to classify them into smooth and non-smooth classes, with the final objective of preserving more details of image. This may be done in the sub-classifier of the image intensity matrix 135 (FIG. 5). This is also shown as 146 in FIG. 6. As shown in FIG. 2, let us consider a block B of size $(K+1) \times (K+1)$ centered at $(x_1,x_2)$, which is a pixel belonging to non-edge class. We define the normalized discrete horizontal gradients $d_h(i,j)$ and vertical gradients $d_h(i,j)$ at the pixel $(i,j) \in B$ as follows:

$$d_h(i,j)=2[g(i,j)-g(i,j+1)]/[g(i,j)+g(i,j+1)],$$

$$d_v(i,j)=2[g(i,j)-g(i+1,j)]/[g(i,j)+g(i+1,j)]. \quad (8)$$

Two shade counters $S_h$ and $S_v$ are incremented whenever the absolute value of the normalized gradient is larger than a smooth contrast threshold $s_1$, i.e., $$S_h=S_h+1 \text{ if } |d_h(i,j)|>s_1,$$

$$S_v=S_v+1 \text{ if } |d_v(i,j)|>s_1. \quad (9)$$

A shade counter functions to calculate the variation in block B. The pixel $(x_1,x_2)$ belonging to non-edge class will be classified into the smooth class S if the following conditions are satisfied:

$$(S_h \leq s_2 \text{ and } S_v \leq s_2) \text{ or } (\sigma \leq \sqrt{0.002 \text{ } m}) \quad (10)$$

where $s_2$ is a threshold, and $\sigma$ and m denote the standard deviation and the average on the block B, respectively. After smoothness testing, the pixels belonging to non-edge will be classified into two classes: smooth and non-smooth. The double median filter is applied on the smooth pixels to smooth out the image. The double median filter may advantageously be used for the SSF 130 previously mentioned. If Med(i,j) is the median of a window centered at (i,j), then the output of double median filter is defined by $$p(x_1,x_2)=median[Med(i,j); (i,j) \in W], \quad (11)$$

for all $(x_1,x_2) \in S$, where W is a window centered at $(x_1,x_2)$.

Again referring to FIGS. 5 and 6, pixels that have been determined to be both non-edge and non-smooth pixels are subject to further analysis in the spatial post-filter 112. The analysis entails a sub-sub classification of the image intensity matrix as shown structurally in sub-sub classifier 137 of FIG. 5 and procedurally in block 150 of FIG. 6. As shown in block 150, the sub-sub classifier 137 determines whether the non-edge, non-smooth pixels are moving or not moving. For those pixels that are determined to be moving, the third sub-filter 132 is applied. This third sub-filter 132 may advantageously be a median filter as shown structurally in FIG. 5 as reference numeral 132 and procedurally in FIG. 6 as reference numeral 152. Thus, if $p(x_1,x_2)$ is the output of the spatial post-filter 112 at pixel $(x_1,x_2)$ belonging to the non-smooth class, then:

$$p(x_1, x_2) = \begin{cases} median[g(i,j); (i,j) \in W] \text{ if } (i,j) \in NS_1 \\ g(x_1, x_2) \text{ if } (i,j) \in NS_2 \end{cases} \quad (12)$$

is the portion of the output of the spatial post-filter 112 associated with the non-smooth pixels where W is a window centered at $(x_1,x_2)$, and $NS_1$ and $NS_2$ denote the set of pixels belonging to the non-smooth moving and non-smooth unmoving classes, respectively.

It should now be apparent that for pixels represented in each given partially reconstructed frame in the set of partially reconstructed frames 103, the spatial post-filter 112 does not adjust the pixel if it is a non-edge, non-smooth, non-moving pixel. This results in the pixel being represented by the second line on the right hand side of equation (12). This representation is effectively calculated as shown in equation (3). However, if $(x_1,x_2)$ is an edge pixel, then $p(x_1,x_2)$ is obtained by equation (7). For the pixels $(x_1,x_2)$ belonging to the smooth class, equation (11) will be applied to obtain $p(x_1,x_2)$.

Additionally, it is preferred that the block size for block matching (as described in the temporal filter sections) is 8×8 and parameter t in equation (3) is set to be 10. The window size for multi-level median and double median filter is 5×5. However, for the median filter in equation (12), the window size is 3×3. This preserves more details of image. The block size of B for smoothness testing in equation (10) is 7×7. If $g(i,j)$ is the image intensity at the pixel $(i,j) \in B$, the parameter $s_1$ in equation (9) is defined as follows:

$$s_1 = \begin{cases} 1.5 & \text{if } d_{av}(i,j) < 48 \\ 0.1 & \text{if } d_{av}(i,j) < 200 \\ 0.045 & \text{otherwise} \end{cases} \quad (13)$$

where $$d_{av}(i,j)=[g(i,j)+g(i,j+1)]/2$$

or $$d_{av}(i,j)=[g(i,j)+g(i+1,j)]/2$$

depending on horizontal or vertical direction. The final parameter $s_2$ in equation (10) is advantageously set to be 7.

A purely spatial post-filter results if the temporal post-filter is eliminated from the system of FIG. 2. The performance of this latter version of the post-filter is upper-bounded by that of the full spatio-temporal filter.

Method of Operation of Preferred Embodiment

The structure of the preferred system described above (using both an adaptive temporal post-filter 110 and an adaptive spatial post-filter 112) will now be described operationally. The operation of the adaptive temporal post-filter 110 will be described with reference to FIG. 4. The operation of the adaptive spatial post-filter 112 will be described with reference to FIG. 5.

Referring to FIG. 4, the temporal filter 110 forms the image intensity matrix. Decision block 136 determines whether the input image sequence is static (e.g., $d_i(x,j)=0$) or dynamic (e.g., $d_i(x_1,j) \neq 0$). It is static if the motion vector is zero. This is done for every pixel, each of which have a motion vector.

If the motion vector for a pixel is zero, assignment block 138 assigns the value of the image intensity of the pixel to a corresponding portion of the image intensity matrix, via the second line of the right hand side of equation (3), and no temporal filtering is necessary. This forms a first portion of what will be the image intensity matrix.

However, if the motion vector is for a pixel non-zero, filter block 140 filters the image intensity with the motion compensating temporal filter 122 described in equation (2). This forms a second portion, via the first line of the right hand side of equation (3), of what will be the image intensity matrix. In this case, the output of the motion compensated temporal filter advantageously represents an average over three frames (e.g., i−1, i, and i+1).

The first and second portions as described above are combined to form the image intensity matrix. This matrix is output to an adaptive spatial post-filter 112 for further processing, the method of which will now be described with reference to FIG. 6.

Referring to FIG. 6, decision block 142 represents part of the temporal filter processing used to determine whether each pixel in the image intensity matrix is an edge pixel or a non-edge pixel. For all pixels determined to be edge pixels, a first sub-filter, as shown in block 144, is applied. For all other pixels, additional determinations are necessary.

For all pixels belonging to the edge class, the first sub-filter block 144 applies is a multi-level median filter in accordance with equation (7). The application of the first sub-filter to edge pixels results in a first portion of the enhanced image matrix.

For all pixels belonging to the non-edge class, decision block 146 determines whether each non-edge pixel is a smooth non-edge pixel or a non-smooth, non-edge pixel. This is done in accordance with equation (10).

For all non-edge pixels that are determined to be smooth, a double median filter or second sub-filter, as shown in block 148, is applied. This is done in accordance with equation (11). This results in a second portion of the enhanced image matrix.

For all non-edge pixels that are determined to be non-smooth, decision block 150 determines whether the non-smooth non-edge pixels are moving. This is done according to the value of the motion vector (a zero motion vector means the pixel is non-moving). The non-moving pixels comprise a third portion of the enhanced image matrix. The moving pixels are filtered with a third sub-filter 152, the result of which is a fourth portion of the enhanced image matrix. The output of the adaptive spatial post-filter, for the non-smooth non-edge pixels (regardless of whether they are moving), is defined by equation (12).

In summary, the output of the adaptive spatial post-filter is defined by equation (7) for those pixels in the image intensity matrix that are edge pixels. The output is further defined by equation (11) for those pixels in the image intensity matrix that are non-edge smooth pixels. Finally, the output is defined by equation (12) for those pixels in the image intensity matrix that are non-edge non-smooth pixels regardless of whether they are moving or non-moving.

The invention has been described with respect to an illustrative preferred embodiment that uses both the adaptive spatial post-filter and the adaptive temporal post-filter. However, it will be apparent to those skilled in the art that many modifications may be made to the illustrative preferred embodiment while remaining within the ambit of the invention. For instance, one may use an adaptive spatial post-filter and omit the adaptive temporal post-filter. Also, a spatial post-filter may be used in combination with the temporal post-filter even though neither post-filter is adaptive. Further, in embodiments using both a spatial and temporal post-filter, the post-filters may be placed in any order.

What is claimed is:

1. A method of enhancing a distorted video signal, the distorted video signal comprising a set of image matrices adapted to be transmitted over a transmission medium of a digital communications setup, the digital communications setup comprising a coder, a decoder, and the transmission medium, the method comprising the steps of:

(a) filtering the set of image matrices with a first post-filter to generate a set of image intensity matrices; and (b) filtering the set of image intensity matrices with a second post-filter to generate a set of enhanced image signals, the filtering comprising:

(1) classifying an image intensity matrix in the set of image intensity matrices into a set of edge pixels and a set of non-edge pixels;

(2) filtering the set of edge pixels with a first sub-filter of the second filter to generate a first portion of an enhanced image matrix in the set of enhanced image signals;

(3) classifying the non-edge pixels into a set of smooth pixels and non-smooth pixels;

(4) filtering the smooth pixels with a second sub-filter of the second filter to generate a second portion of the enhanced image matrix;

(5) classifying the non-smooth pixels into a set of moving pixels and a set of non-moving pixels, the set of non-moving pixels comprising a third portion of the enhanced image matrix;

(6) filtering the set of moving pixels with a third sub-filter of the second filter to generate a fourth portion of the enhanced image matrix;

(7) combining the first portion, the second portion, the third portion, and the fourth portion to form the enhanced image matrix; and (8) repeating steps (b)(1) through (b)(7) for other enhanced image matrices in the set of enhanced image signals.

2. The method of claim 1 wherein the step of classifying the matrix comprises determining if an input image sequence is static, $(d_t(x,j)=0)$.

3. The method of claim 1 wherein the first sub-filter is a multi-level median filter, the second sub-filter is a double median filter and the third sub-filter is a median filter.

4. The method of claim 1 wherein the first post-filter is comprised of a temporal post-filter and the second post-filter is comprised of a spatial post-filter.

5. The method of claim 4 wherein both the temporal post-filter and the spatial post-filter are adaptive.

6. The method of claim 1 further comprising the step of visually displaying the set of enhanced image matrices.

7. The method of claim 1 wherein the step of filtering the set of image matrices with the first post-filter comprises:

(a) classifying an image matrix in the set of image matrices into a set of static pixels and a set of dynamic pixels, the set of static pixels comprising a first portion of an image intensity matrix in the set of image intensity matrices;

(b) filtering the set of dynamic pixels with a motion compensating temporal filter to generate a second portion of the image intensity matrix;

(c) combining the first portion with the second portion to form an image intensity matrix; and (d) repeating steps (a) through (c) for other image matrices in the set of image matrices.

* * * * *